United States Patent
Hall et al.

(10) Patent No.: US 9,643,782 B1
(45) Date of Patent: May 9, 2017

(54) AUTOMATIC STORAGE AND RETRIEVAL SYSTEM WITH PLANAR MOTION MECHANISM

(71) Applicants: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US)

(72) Inventors: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US)

( * ) Notice: Subject to any disclaimer, the term of this patent is extended or adjusted under 35 U.S.C. 154(b) by 0 days.

(21) Appl. No.: 15/248,589

(22) Filed: Aug. 26, 2016

(51) Int. Cl.
*B65G 1/137* (2006.01)
*B65G 1/06* (2006.01)
*B65G 1/12* (2006.01)

(52) U.S. Cl.
CPC .............. *B65G 1/137* (2013.01); *B65G 1/06* (2013.01); *B65G 1/12* (2013.01)

(58) Field of Classification Search
CPC ............. B65G 1/137; B65G 1/06; B65G 1/12
See application file for complete search history.

(56) References Cited

U.S. PATENT DOCUMENTS

| | | | | |
|---|---|---|---|---|
| 9,108,360 | B2 * | 8/2015 | Comb | F16H 19/06 |
| 9,151,770 | B2 * | 10/2015 | Reuteler | G01N 35/0099 |
| 9,469,492 | B2 * | 10/2016 | Kashihara | B65G 67/00 |
| 2008/0264304 | A1 * | 10/2008 | Grainger | B65G 1/02 |
| | | | | 108/51.11 |
| 2015/0014215 | A1 * | 1/2015 | Jacobsson | H05K 13/0084 |
| | | | | 206/718 |
| 2017/0036859 | A1 * | 2/2017 | Lopes Ribeiro | B65G 1/137 |
| 2017/0036867 | A1 * | 2/2017 | Zhou | B65G 49/067 |
| 2017/0053099 | A1 * | 2/2017 | Coughlin | G06F 19/3462 |

* cited by examiner

Primary Examiner — Thomas Randazzo

(57) ABSTRACT

The invention is an automated storage and retrieval system in which objects within the system may be repositioned one at a time in a circular or non-circular sequence. The system comprises a frame with one or more walls, one or more movable objects arranged in columns within the frame, one or more connectors mounted to the walls to which the movable objects are attached, and one or more planar motion mechanisms mounted to the frame. The system further comprises suspending the objects from the planar motion mechanisms to reposition the objects within the frame. Preferably, the planar motion mechanism is an H-bot. The objects can be storage bins or appliances. Advantages of the system are that it objects can be retrieved more quickly, the system can operate at less than full capacity, and the objects do not stack and therefore do not have strict structural requirements.

20 Claims, 18 Drawing Sheets

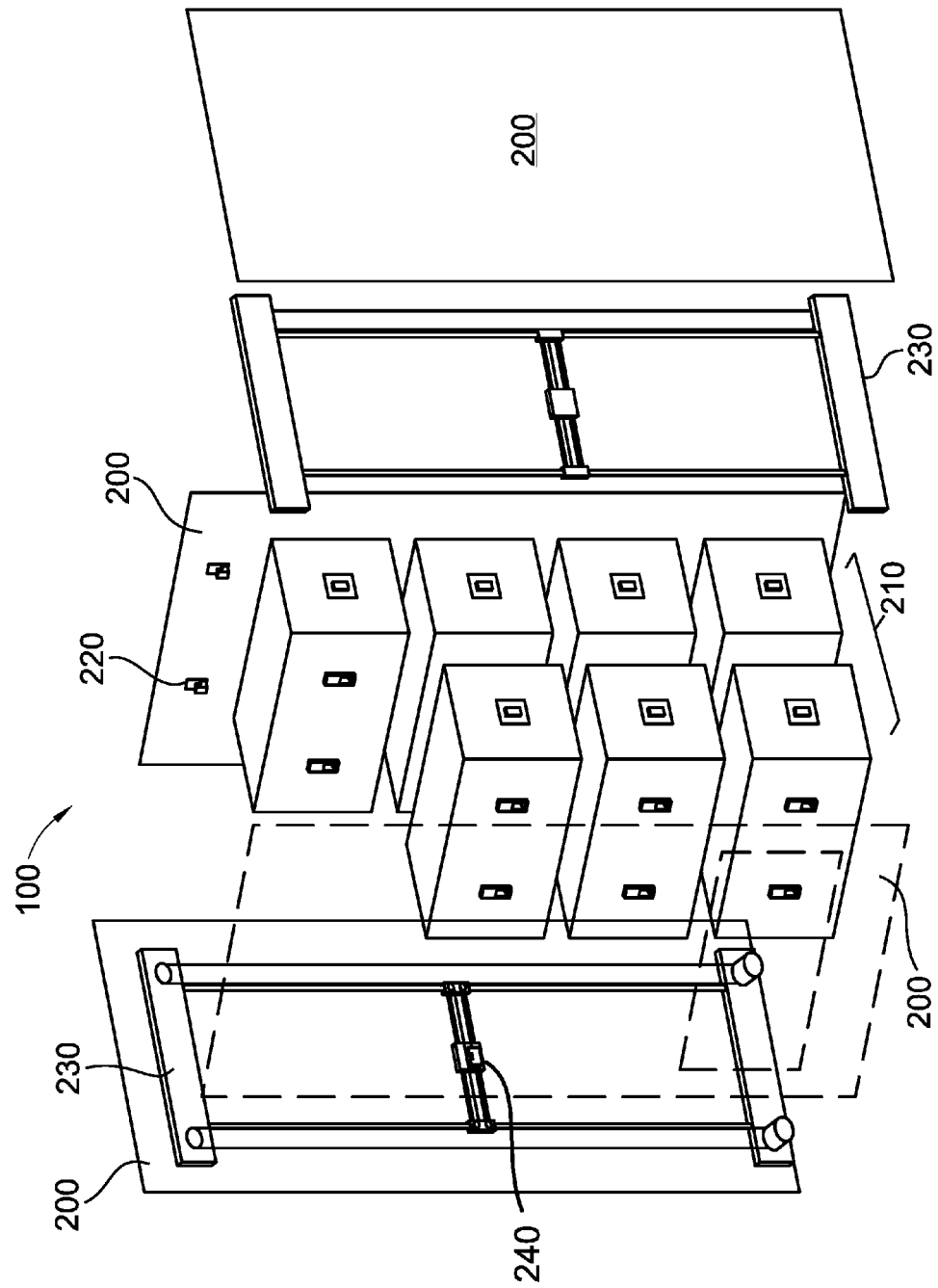

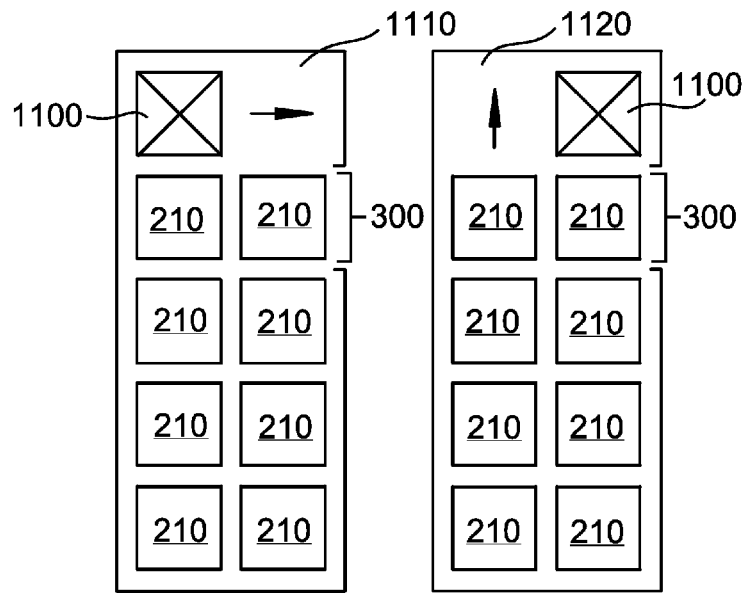
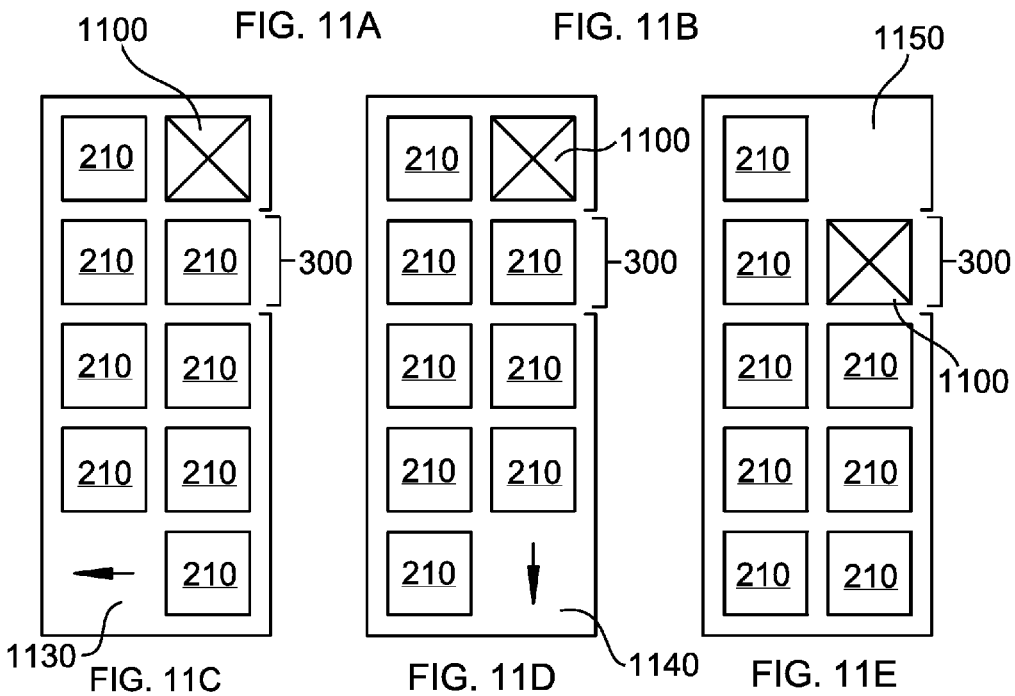
FIG. 11A  FIG. 11B  FIG. 11C  FIG. 11D  FIG. 11E

AUTOMATIC STORAGE AND RETRIEVAL SYSTEM WITH PLANAR MOTION MECHANISM

TECHNICAL FIELD

This invention relates generally to the field of storage systems, and more specifically to automatic storage and retrieval systems.

BACKGROUND

Homes, offices, warehouses, and other buildings are in constant need of more storage space. Areas within the buildings—closets, cupboards, attics, shelves, and the like—are often set apart for this purpose, but these storage spaces are seldom used efficiently or to full capacity. Even when the spaces are used to full capacity, maintaining order and accessibility presents a further challenge. Accordingly, various storage systems have been designed to improve the efficiency, accessibility, and organization of various storage spaces.

One such storage system design is an automated storage and retrieval system. An automated storage and retrieval system allows a user to select a desired item or set of items and instruct that the items be brought by mechanical means from distant storage areas to a convenient access point. Thus, automated storage and retrieval systems provide a convenient method for locating and accessing goods while utilizing space that would otherwise be difficult to access.

A wide variety of automated storage and retrieval systems exist in the prior art. Larger scale systems—for example, those used in a warehouse setting—use a variety of automated conveyor belt and/or transport vehicle devices to store and retrieve items. In such cases, items are stacked in multiple layers and space is allotted on at least one side of each stack to access and remove an item at any location within the stack. In smaller scale settings, storage and retrieval systems have been designed that rearrange stored items within a stack until a desired item is accessible at a designated access point.

One example of the latter is a revolving carousel. In the carousel, items are rearranged by moving around a circular track, allowing each item to pass through an access point in turn. This requires less space than the larger scale systems described above; however, this design is still not the most efficient given that space must still be allotted on each circular portion of the track to allow items to pass by each other.

An improvement on the revolving carousel optimizes space by moving items only linearly. In such a method, repeatedly moving one item horizontally from either the top or bottom of a stack and then moving all of the items remaining in the stack vertically to fill the vacant space, creates a circular motion, such that a desired box eventually reaches an access point. Certain embodiments utilize tracks and wheels or conveyors for horizontal movement and lifts for vertical movement. While this linear movement method has a smaller space requirement than the carousel, current embodiments still have several disadvantages.

One disadvantage is that each column of items is supported by the bottom item, which requires that each item in the column be able to bear the weight of all items above it. This places structural requirements on each item that increase costs and waste space. Another disadvantage is that the system can only function if it is at full capacity (meaning it has exactly one vacancy). Furthermore, while the system is not limited to only two columns of items, due to the rotational motion and the nature of the actuators that enable it, any additional column could only accommodate two items, one at the top and one at the bottom. Finally, a disadvantage is that an item must pass through the full rotation before it can be accessed, rather than allowing often-used items to maintain positions of easy access, while seldom-used items maintain distant positions.

In light of the foregoing, what is needed is an automated storage and retrieval system that utilizes linear movement, but that improves on these disadvantages.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow different arrangements of objects in a storage and retrieval system to be repositioned by moving the objects one at a time in a non-circular sequence.

Consistent with the foregoing, an automated storage and retrieval system is disclosed. The automated storage and retrieval system comprises a frame that comprises one or more walls within and about the periphery of the frame, one or more positionable objects comprising an attachment mechanism arranged planarly within the frame, one or more connectors mounted to the one or more walls, and one or more planar motion mechanisms comprising an attachment mechanism movably mounted to the frame adjacent to the one or more positionable objects. The one or more positionable objects are removably attached to the one or more connectors. The one or more planar motion mechanisms select one of the one or more positionable objects. The one or more planar motion mechanisms comprise one or more end effectors comprising an attachment mechanism which retrieves, connects to, and suspend the selected one of the one or more positionable objects from the one or more connectors and reposition the selected one of the one or more positionable objects within the frame.

In one embodiment, the one or more positionable objects are repositioned in a revolving clockwise or counterclockwise sequence, and in another embodiment, they are repositioned in a non-revolving sequence. In different embodiments, the one or more positionable objects are arranged in a varying number of columns, have certain dimensions, comprise storage bins or appliances, or are spaced according to particular dimensions. In different embodiments, the one or more planar motion mechanisms comprise electromechanical mechanisms, sometimes H-bots, in varying numbers. In certain embodiments, the connectors comprise magnets or hooks, the hooks comprising electrical conductors in some embodiments. Finally, the automated storage and retrieval system may comprise one or more access ports or openings or a user interface in certain embodiments.

BRIEF DESCRIPTION OF THE DRAWINGS

A more particular description of the invention briefly described above is made below by reference to specific embodiments depicted in drawings included with this application, in which:

FIG. 2 depicts an exploded interior view of one embodiment of an automated storage and retrieval system;

Figure 4B:
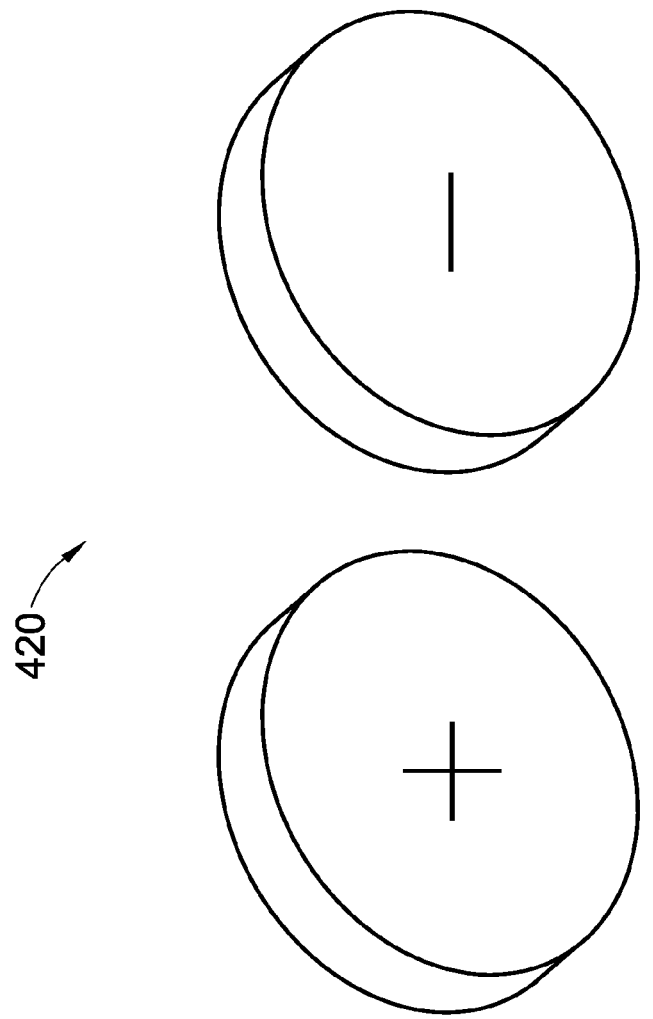
Figure 4A:
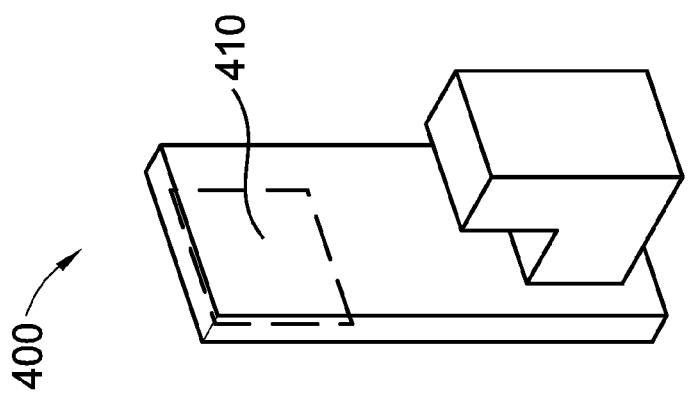
Figure 5A:
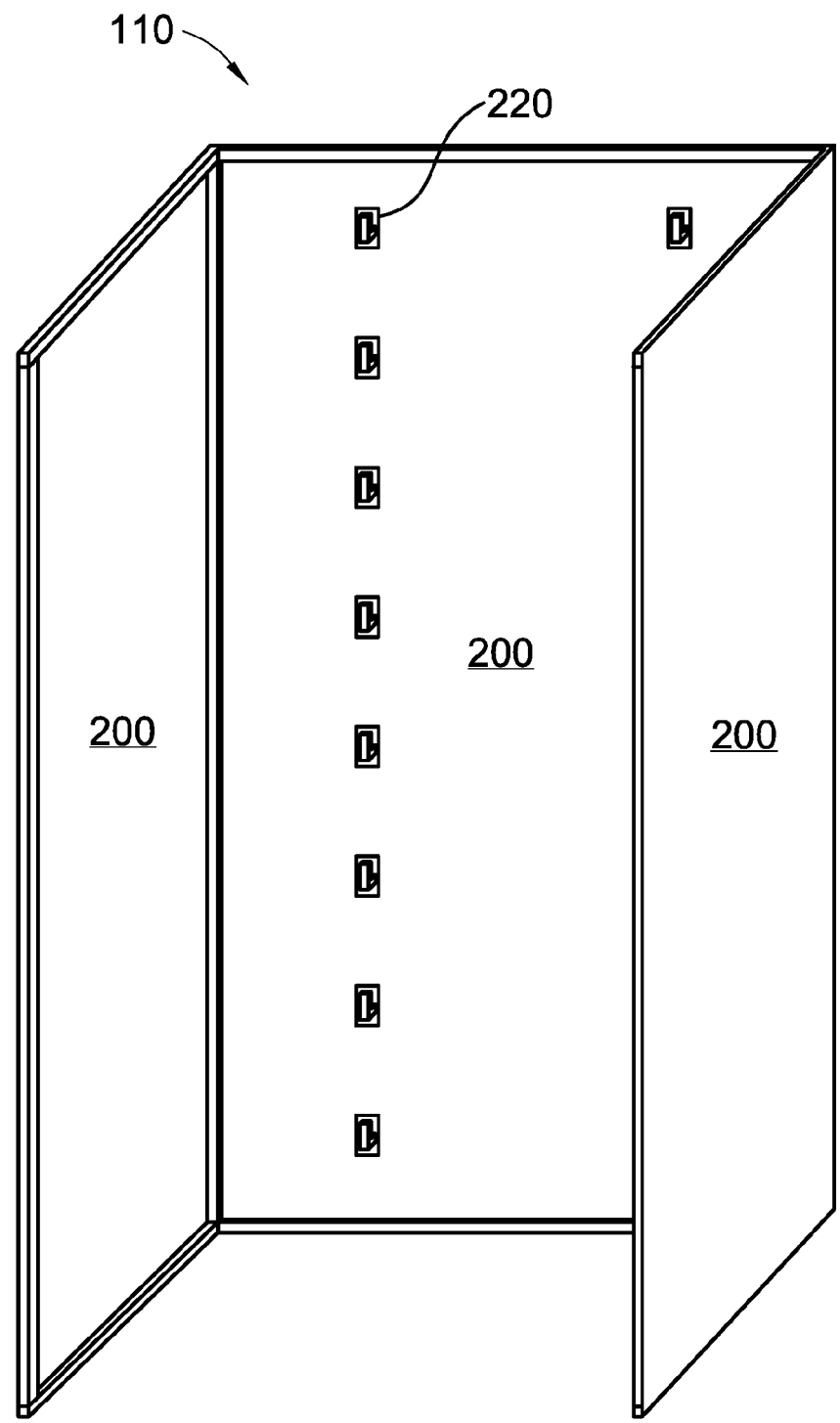
Figure 5B:
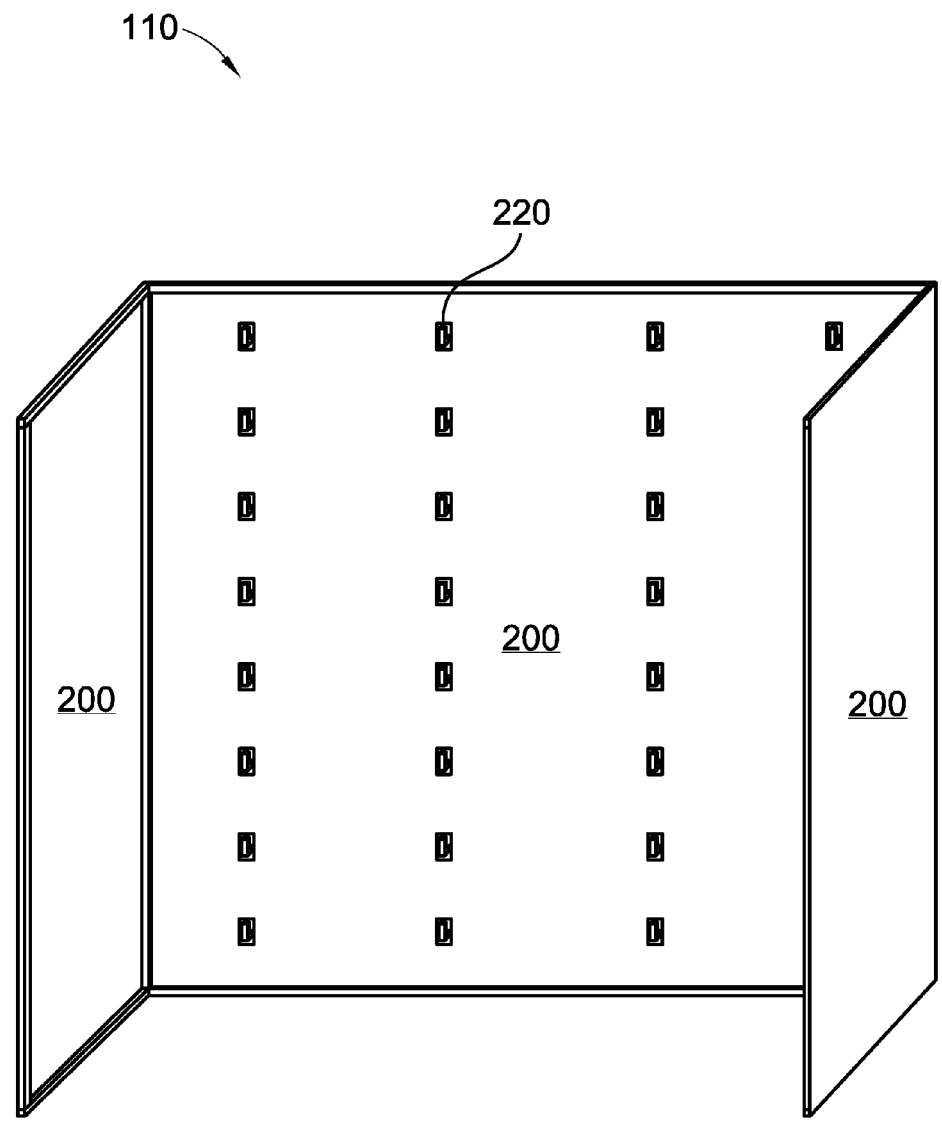
Figure 6A:
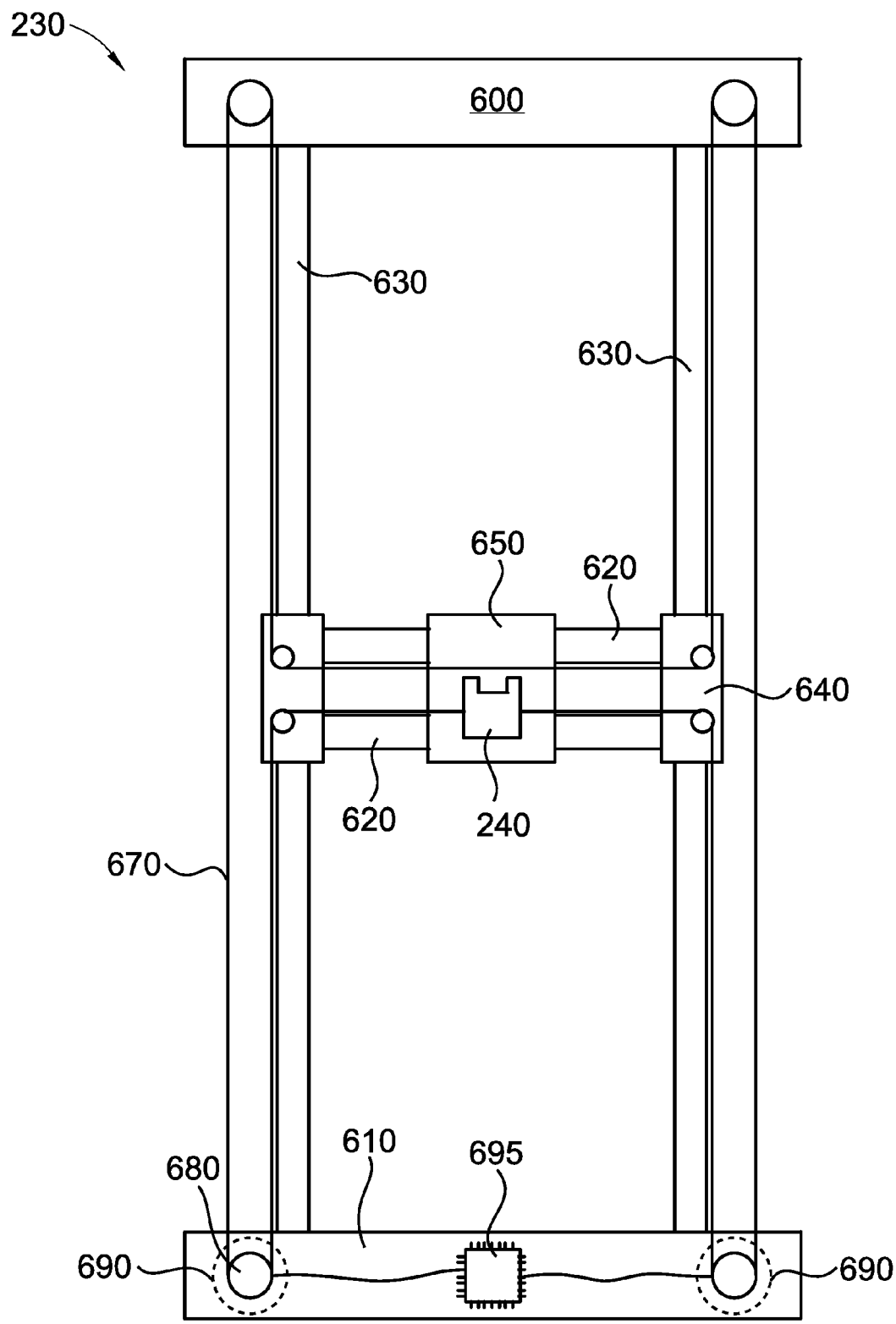
Figure 6B:
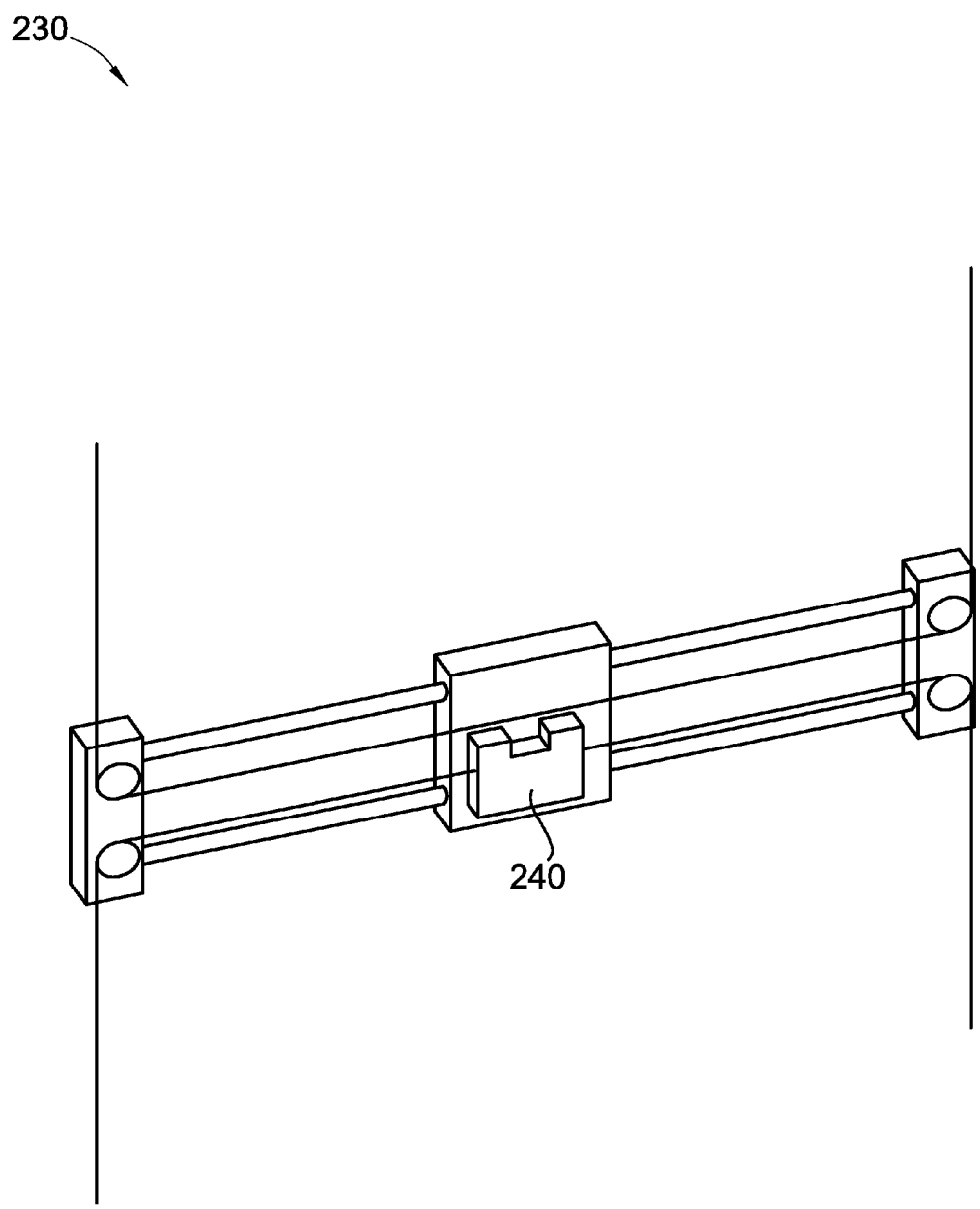
Figure 7A:
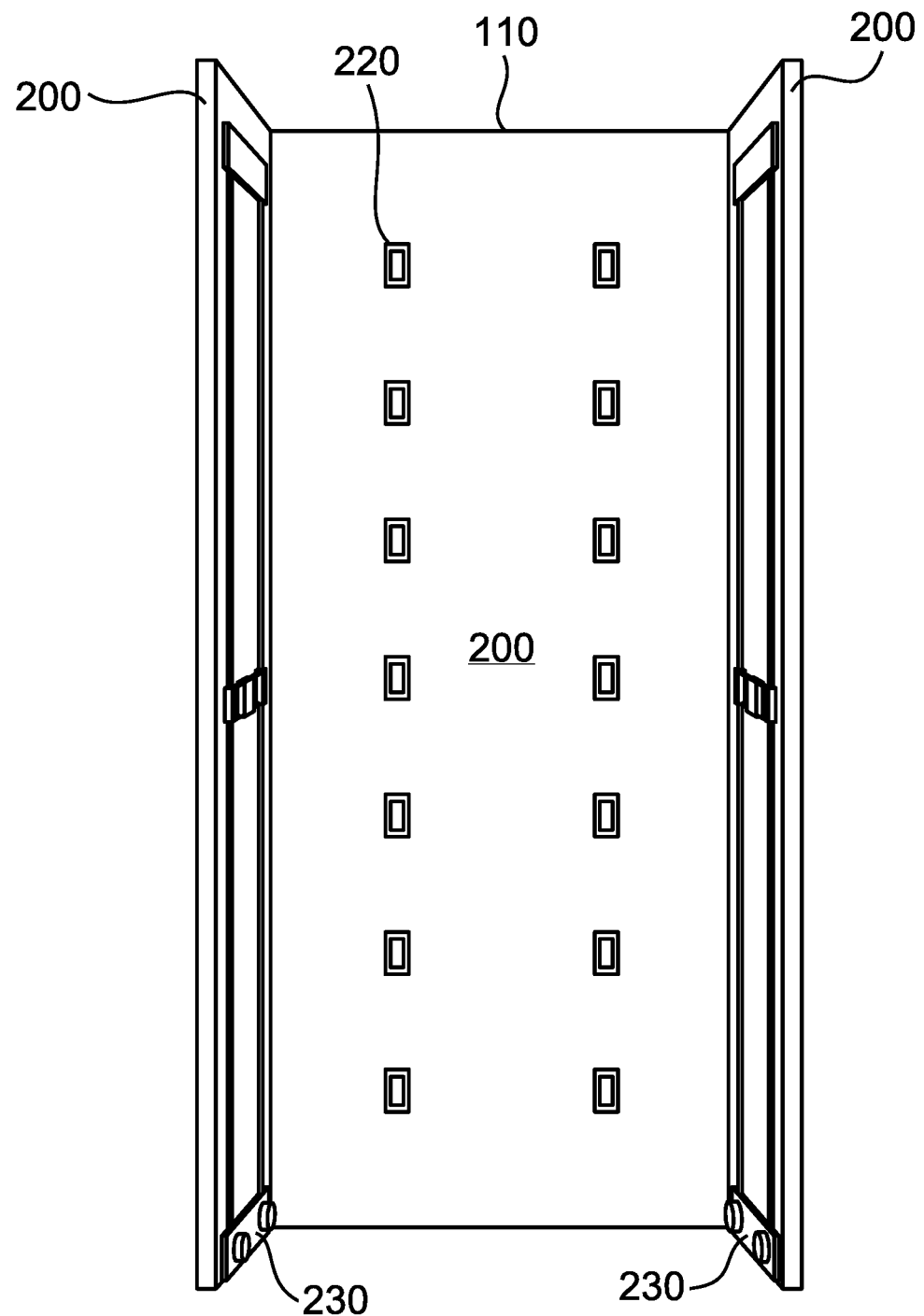
Figure 7B:
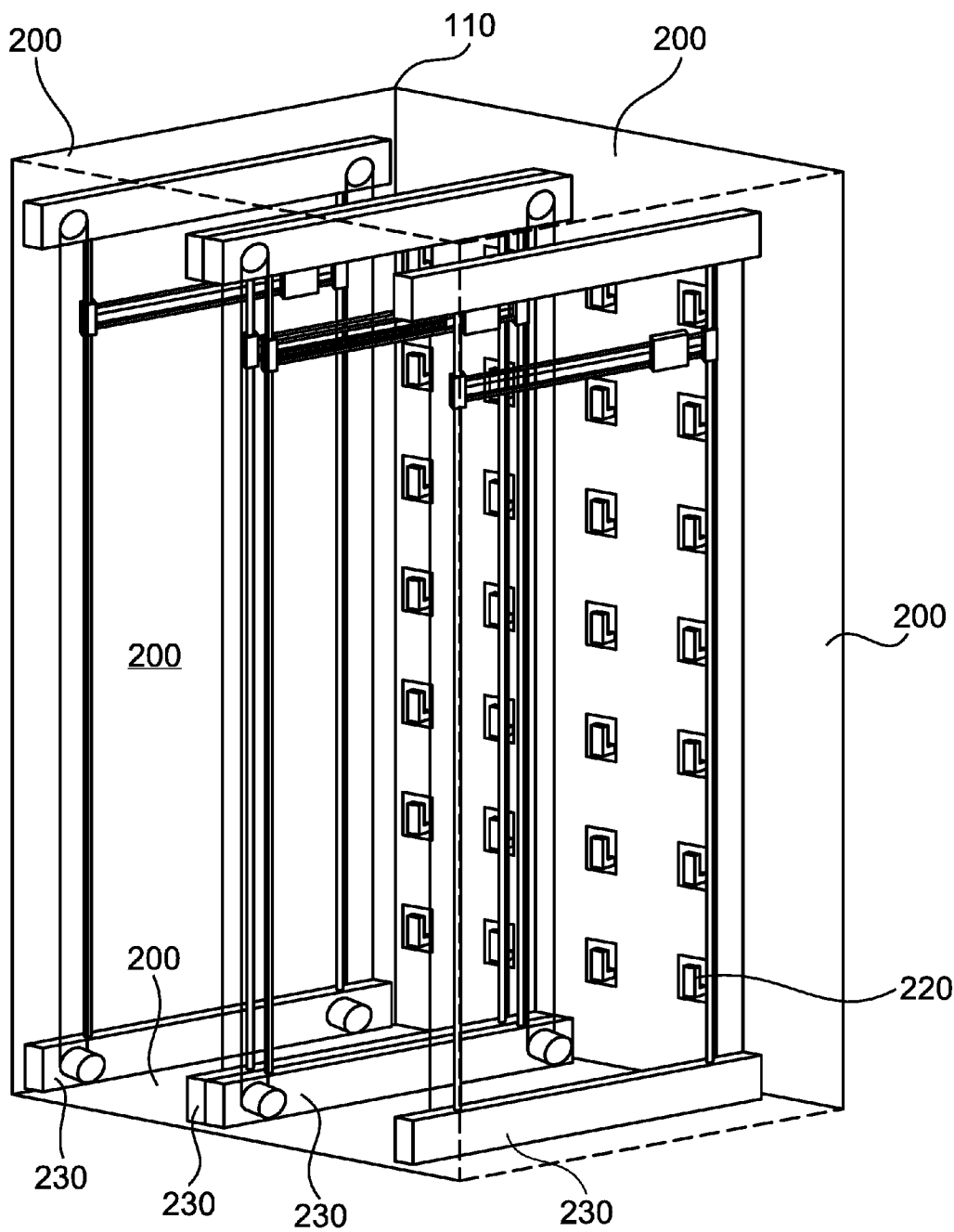
Figure 8:
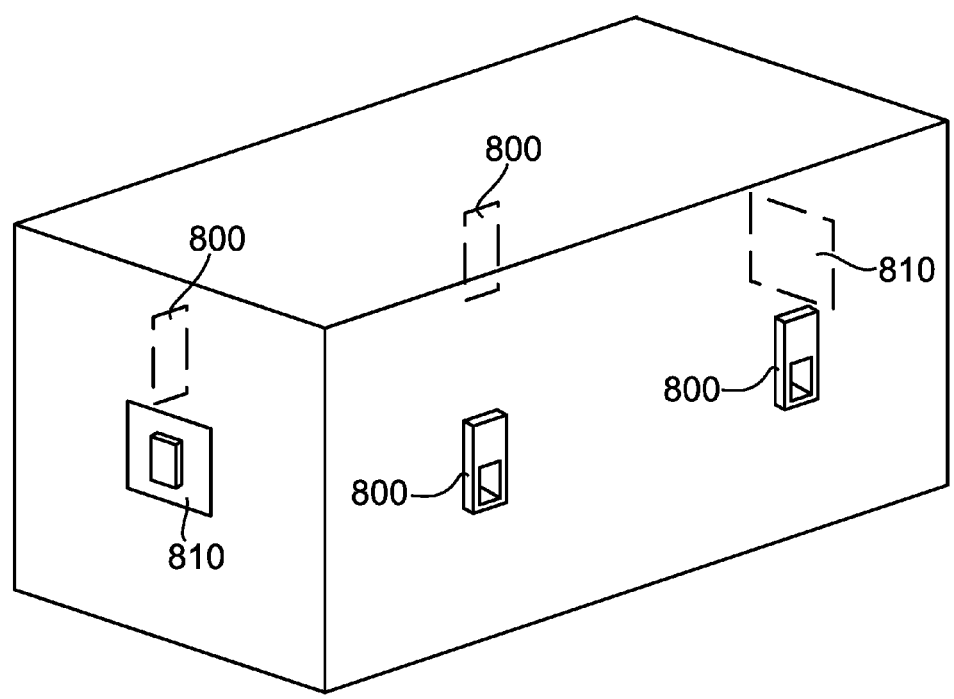
Figure 9A:
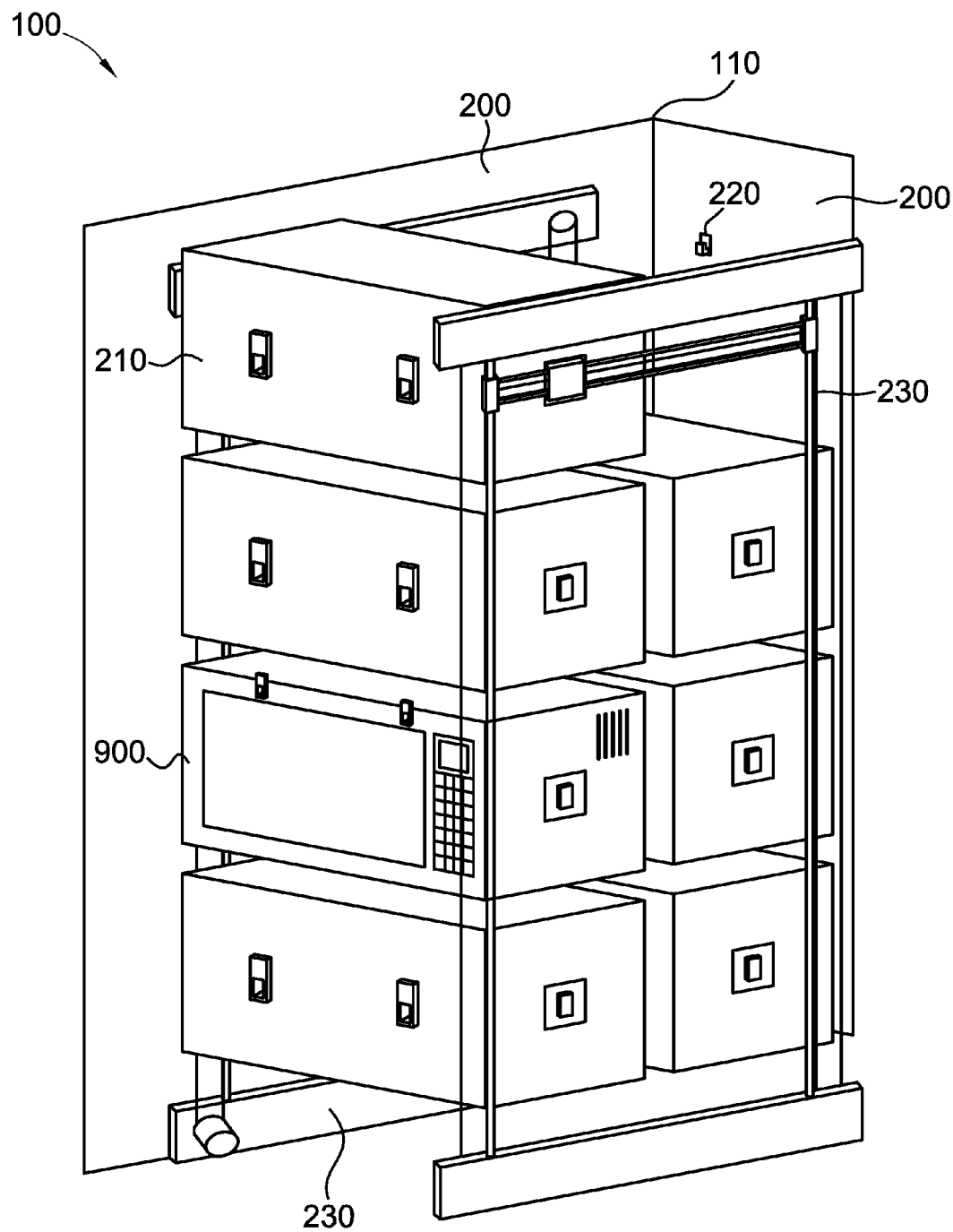
Figure 9B:
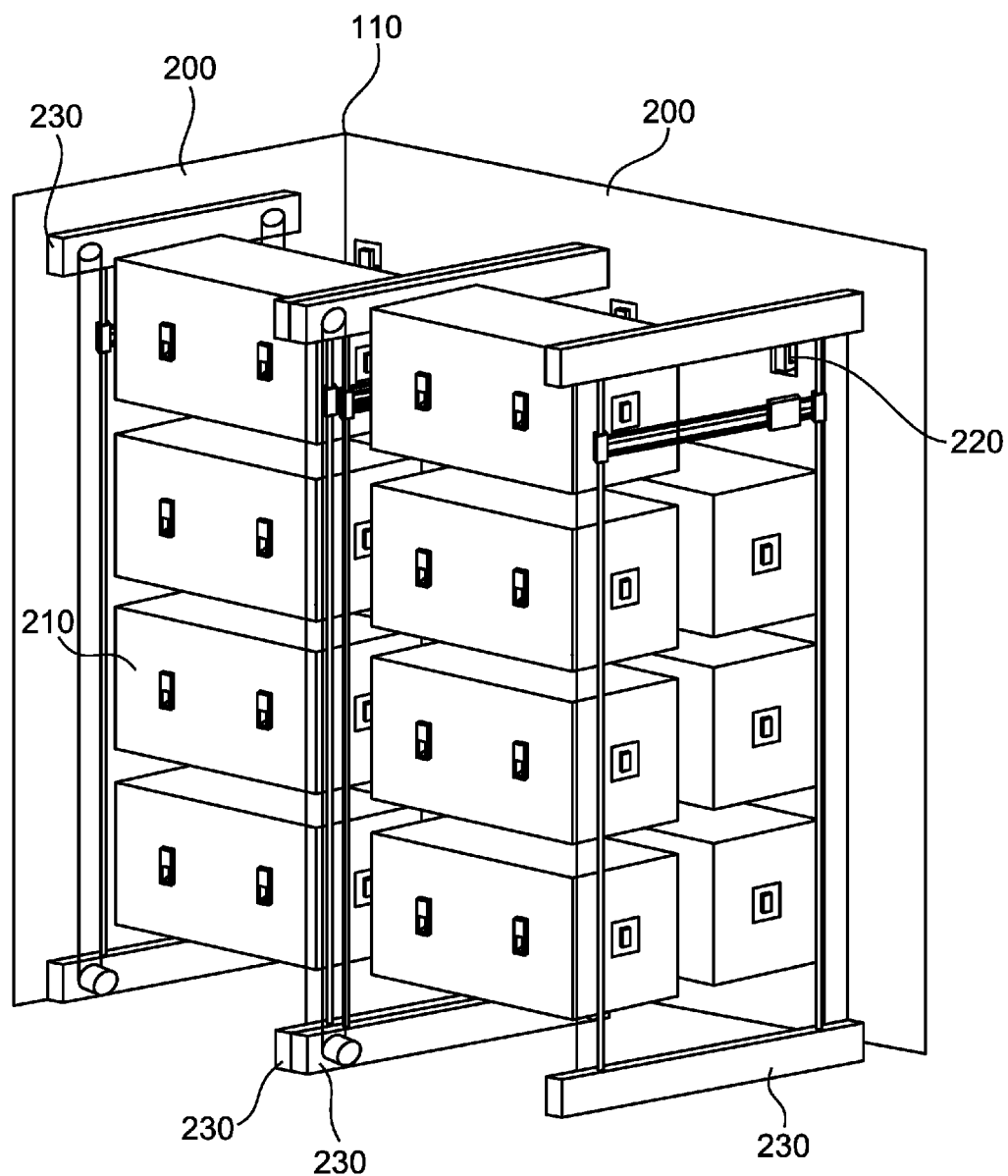
Figure 10:
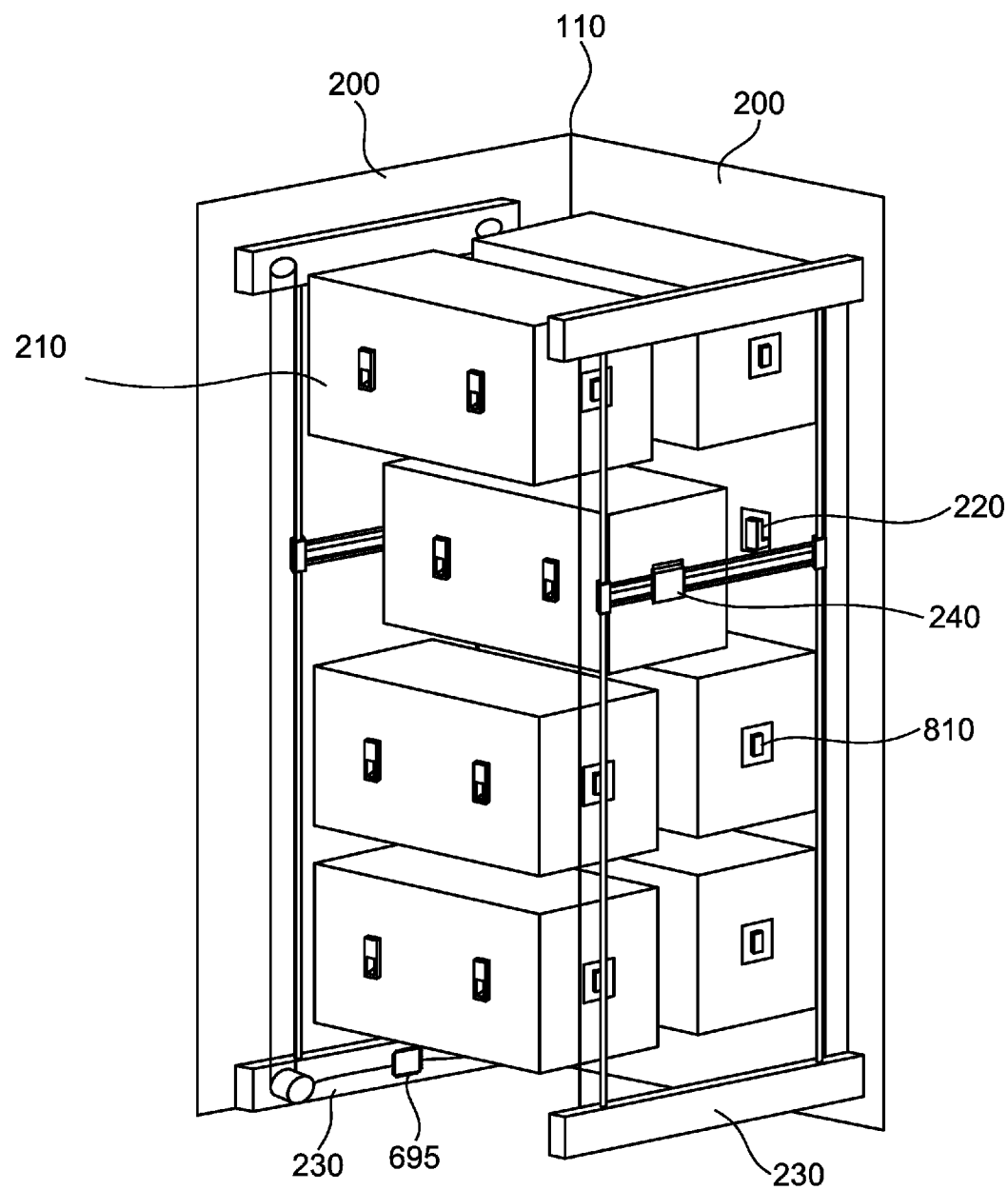
Figure 12A:
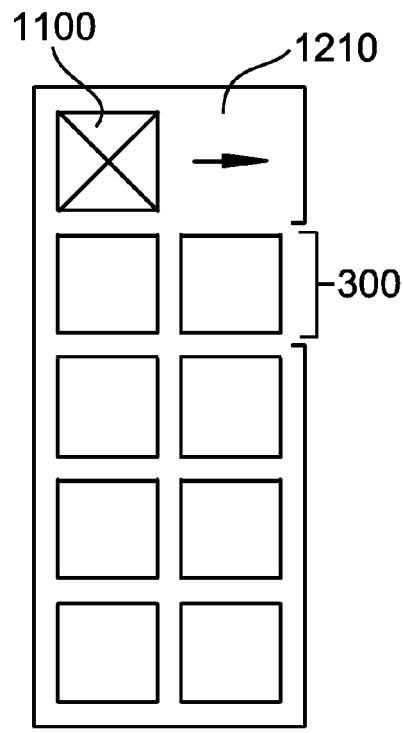
Figure 12B:
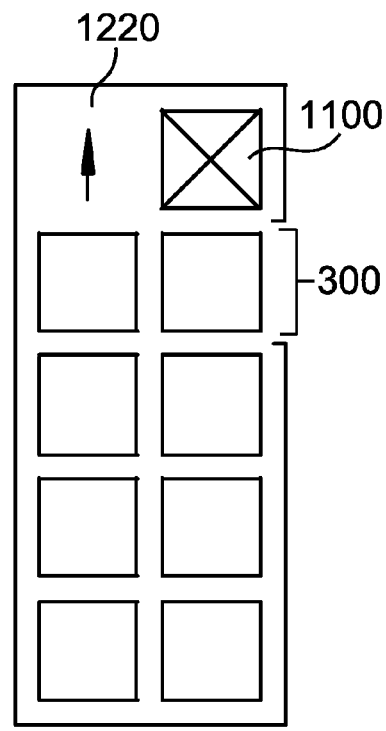
Figure 12C:
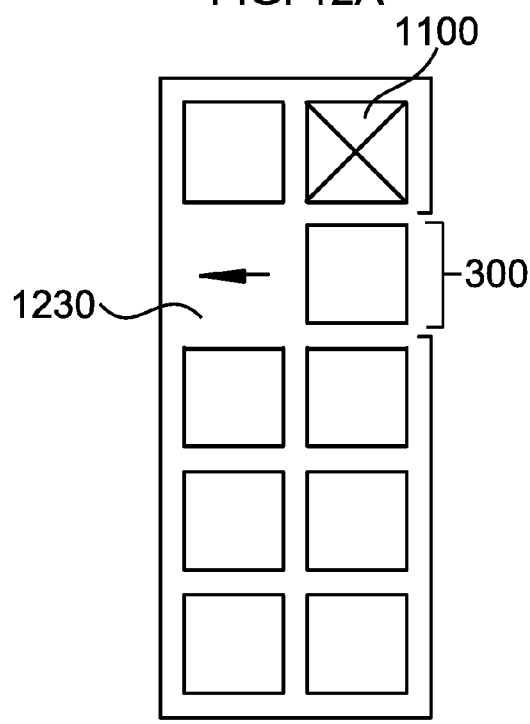
Figure 12D:
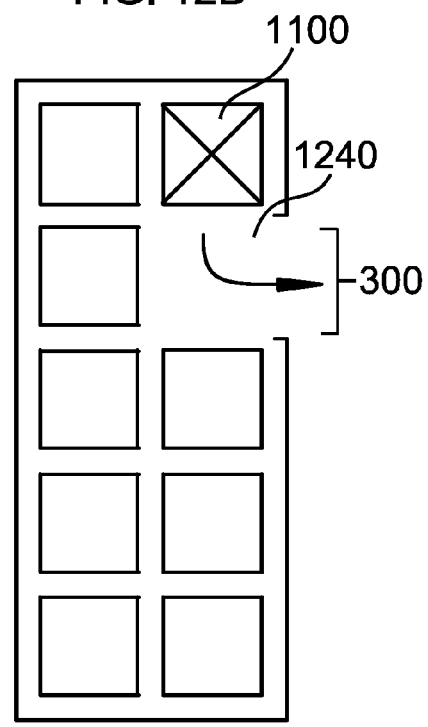
Figure 13:
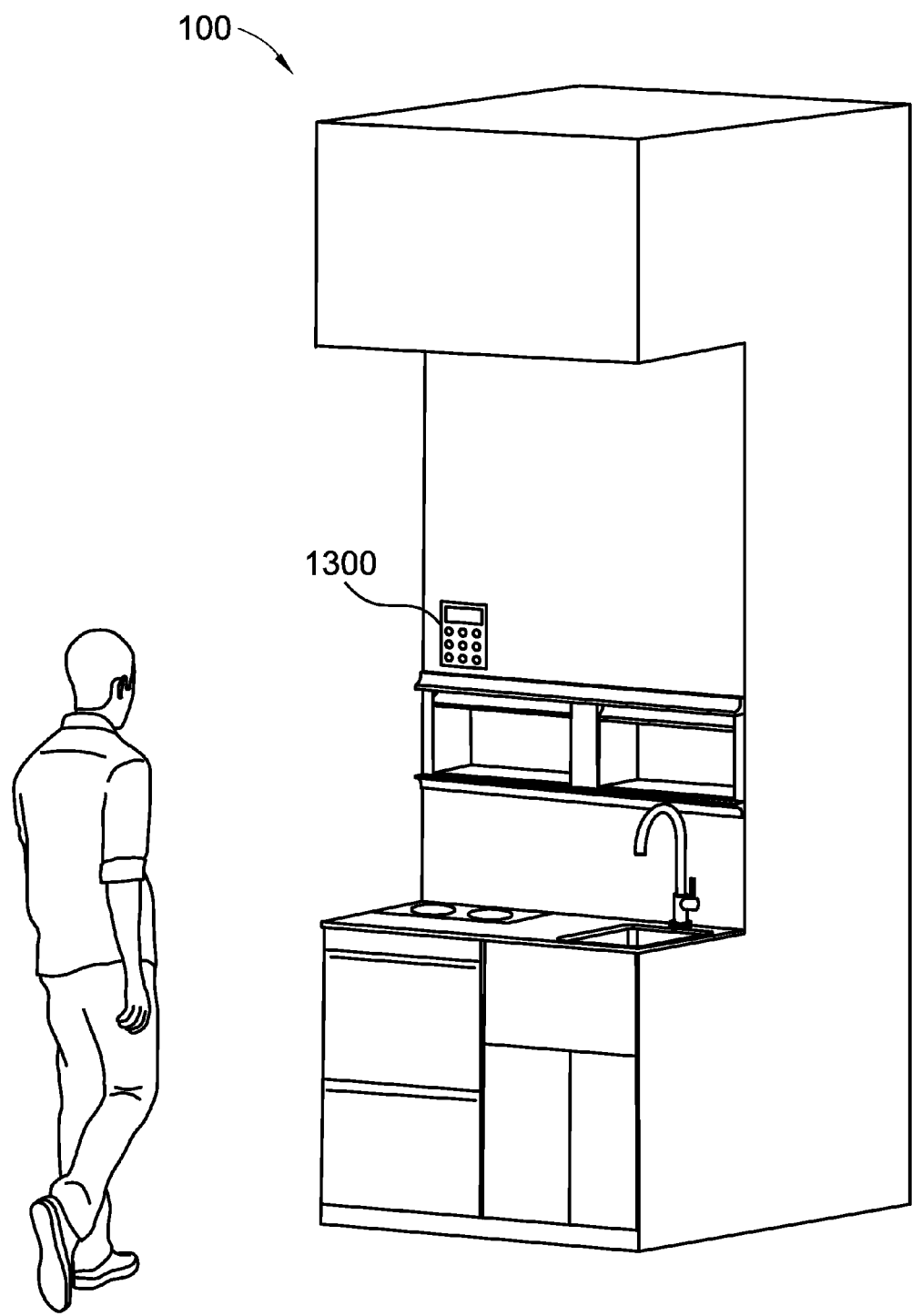

FIB. 3A depicts one embodiment of a frame with one access port openings;

FIB. 3B depicts one embodiment of a frame with two access ports openings;

FIG. 4A depicts one embodiment of a hook;

FIG. 4B depicts one embodiment of a set of magnets;

FIG. 5A depicts one embodiment of the one or more connectors mounted to the one or more walls of the frame, arranged to accommodate the one or more positionable objects in two columns;

FIG. 5B depicts one embodiment of the one or more connectors mounted to the one or more walls of the frame, arranged to accommodate the one or more positionable objects in four columns;

FIG. 6A depicts one embodiment of a planar motion mechanism;

FIG. 6B depicts one embodiment of an end effector of a planar motion mechanism;

FIG. 7A depicts one embodiment of two planar motion mechanisms mounted to the frame;

FIG. 7B depicts one embodiment of four planar motion mechanisms mounted to the frame;

FIG. 8 depicts one embodiment of a positionable object;

FIG. 9A depicts one embodiment of the one or more positionable objects arranged in two columns within the frame and the one or more planar motion mechanisms movably mounted to the frame adjacent to the one or more positionable objects;

FIG. 9B depicts one embodiment of the one or more positionable objects arranged in four columns within the frame and the one or more planar motion mechanisms movably mounted to the frame adjacent to the one or more positionable objects;

FIG. 10 depicts one embodiment of the one or more planar motion mechanisms comprising an end effector retrieving and suspending a selected one of the one or more positionable objects from the one or more connectors and repositioning the selected one of the one or more positionable objects within the frame;

FIG. 11A depicts the one or more positionable objects being repositioned in a revolving clockwise or counterclockwise sequence;

FIG. 11B depicts the one or more positionable objects being repositioned in a revolving clockwise or counterclockwise sequence;

FIG. 11C depicts the one or more positionable objects being repositioned in a revolving clockwise or counterclockwise sequence;

FIG. 11D depicts the one or more positionable objects being repositioned in a revolving clockwise or counterclockwise sequence;

FIG. 11E depicts the one or more positionable objects being repositioned in a revolving clockwise or counterclockwise sequence;

FIG. 12A depicts the one or more positionable objects being repositioned in a non-revolving sequence;

FIG. 12B depicts the one or more positionable objects being repositioned in a non-revolving sequence;

FIG. 12C depicts the one or more positionable objects being repositioned in a non-revolving sequence;

FIG. 12D depicts the one or more positionable objects being repositioned in a non-revolving sequence; and FIG. 13 depicts an automated storage and retrieval system comprising a user interface.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
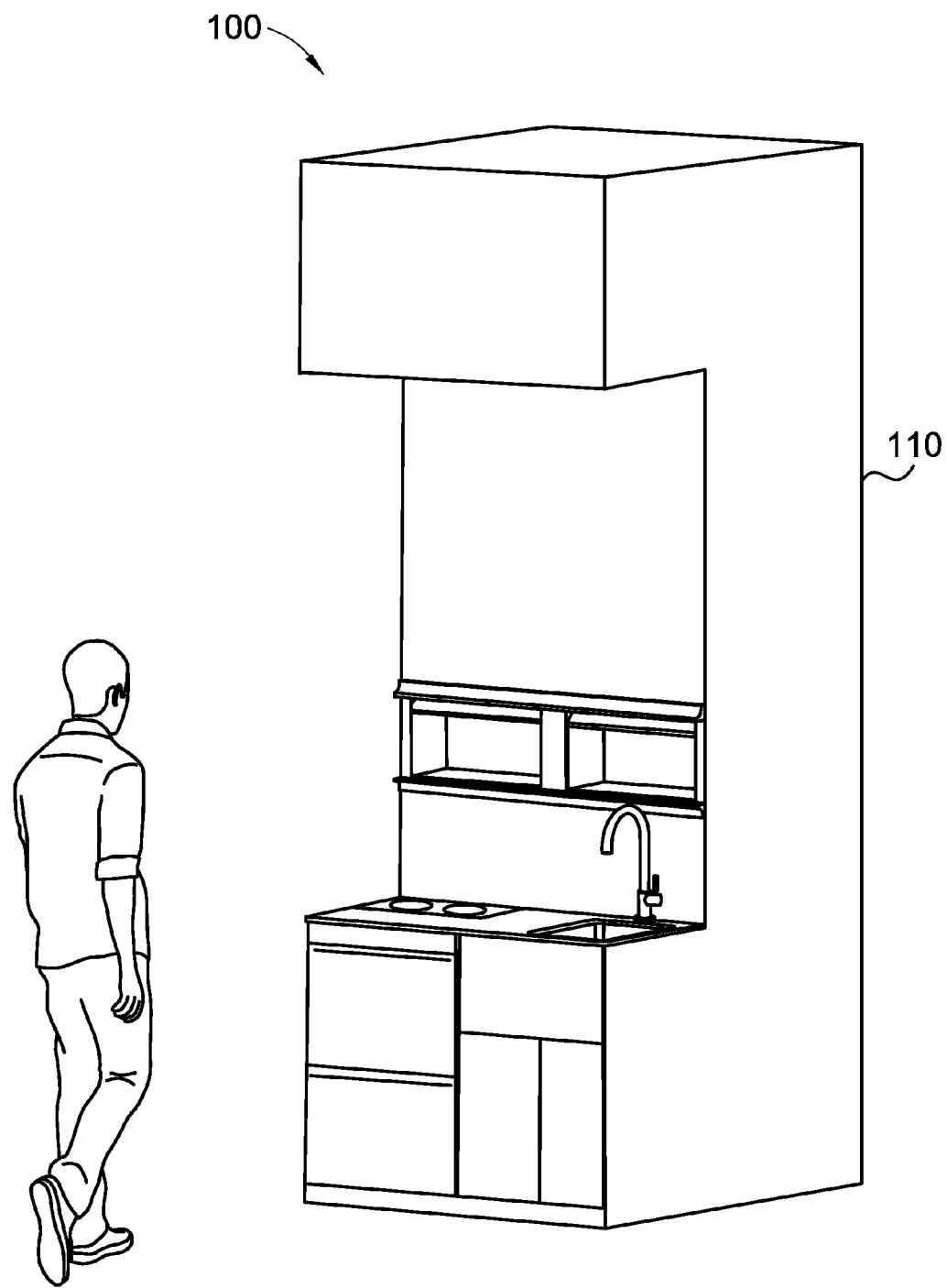
FIG. 1 depicts a perspective view of the exterior of one embodiment of an automated storage and retrieval system.

FIG. 1 depicts the exterior of one embodiment of an automated storage and retrieval system 100. The automatic storage and retrieval system 100 comprises a frame 110, which can be seen from this exterior view. The automatic storage and retrieval system 100 can be useful for many applications, including for storing appliances in a kitchen, as depicted in FIG. 1.

FIG. 2 depicts an exploded interior view of one embodiment of an automated storage and retrieval system 100. The automated storage and retrieval system 100 comprises a frame 110, which comprises one or more walls 200; one or more positionable objects 210 comprising an attachment device and an attachment mechanism, arranged planarly within the frame 110; one or more connectors 220, mounted to the one or more walls 200; and one or more planar motion mechanisms 230, movably mounted to the frame 110 adjacent to the one or more positionable objects 210, which select one of the one or more positionable objects 210. The one or more positionable objects 210 are removably attached to the one or more connectors 220. The one or more planar motion mechanisms 230 comprise one or more end effectors 240 comprising an attachment mechanism, which retrieve and suspend the selected one of the one or more positionable objects 210 from the one or more connectors 220 and reposition the selected one of the one or more positionable objects 210 within the frame 110.

Figure 3A:
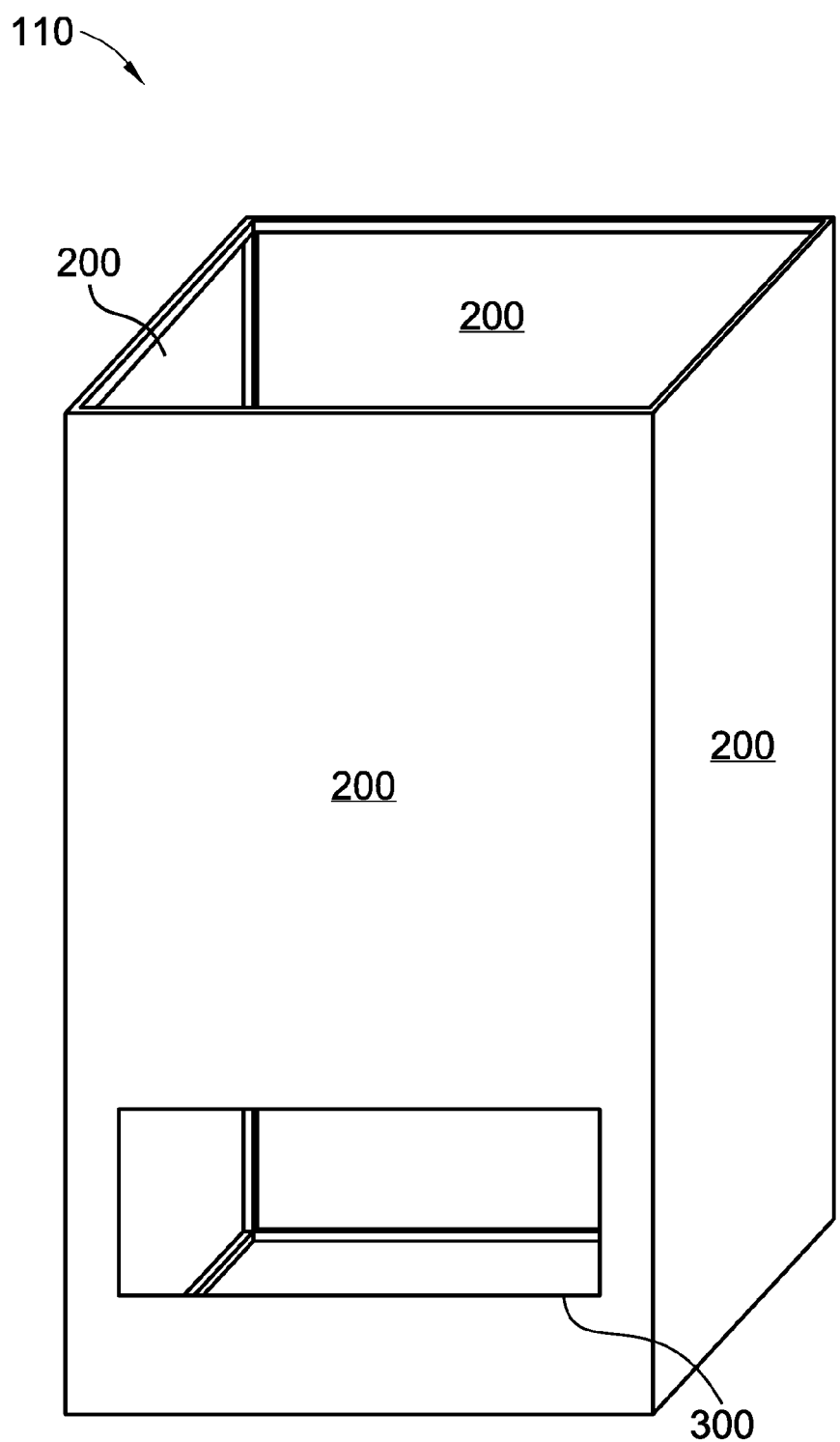
Figure 3B:
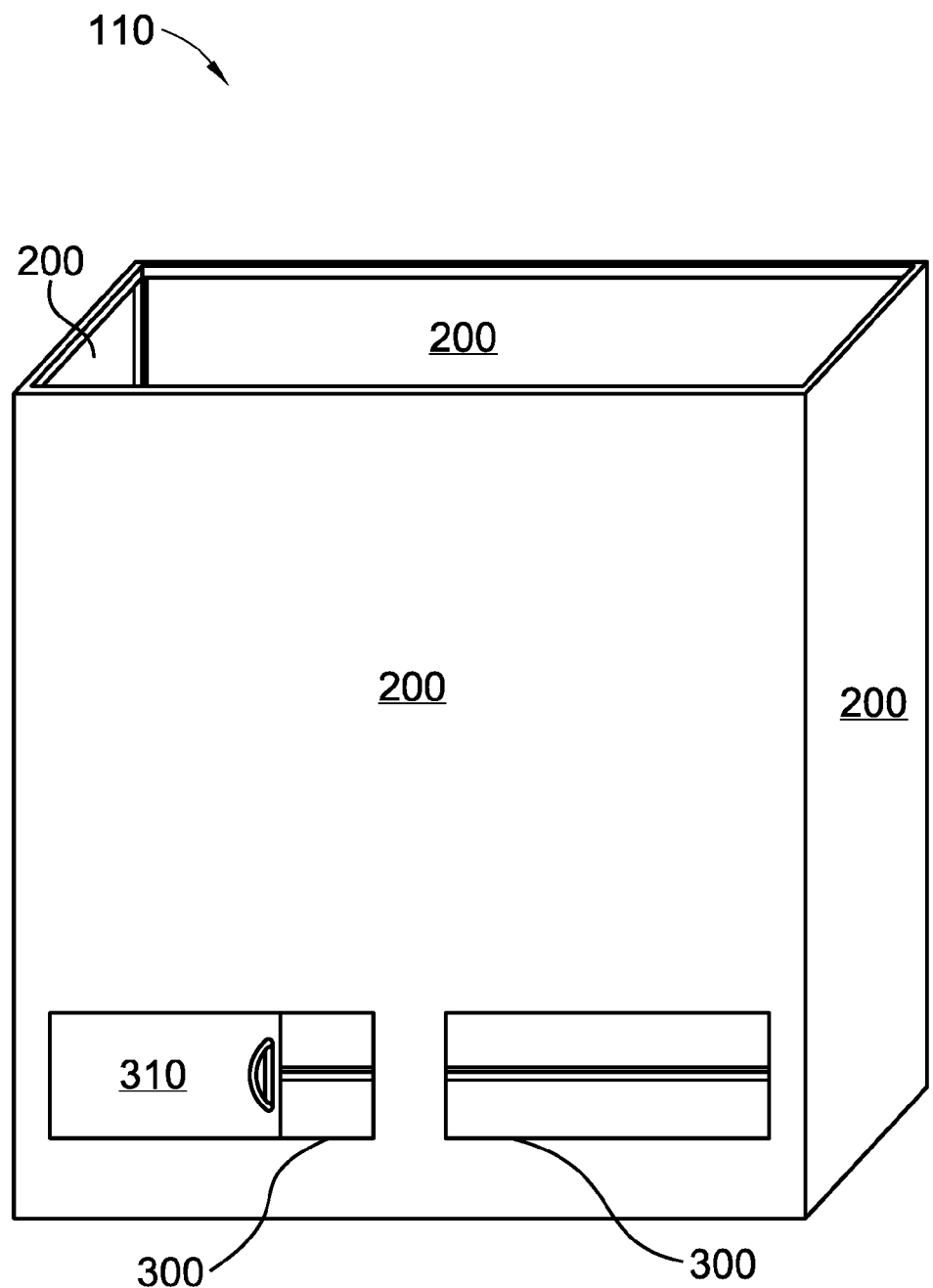

FIG. 3A and FIG. 3B depict embodiments of a frame 110. The frame 110 comprises one or more walls 200. In a preferred embodiment, the frame 110 comprises a rectangular prismatic configuration. The height, length, and width measurements of the frame 110 are variable, corresponding to the number and size of the positionable objects 210 within. In one embodiment, the frame 110 further comprises one or more access ports or openings 300. Each access port 300 comprises a window that provides access to only one of the one or more positionable objects 210. In a preferred embodiment, each access port or opening 300 is located on a lower portion of the one or more walls 200. FIG. 3A depicts one embodiment of frame 110 with one access port 300. In this embodiment, the positionable objects 210 would be arranged in two columns within the frame. FIG. 3B depicts another embodiment of frame 110 with two access ports 300. In this embodiment, the positionable objects 210 would be arranged in four columns within the frame. In other embodiments, frame 110 comprises more than two access ports 300. In these embodiments, the positionable objects 210 would be arranged in more than four columns within the frame. In one embodiment, each access port 300 comprises a removable covering 310, the removable covering 310 comprising one of a group comprising a flap that opens from the top or the bottom, a sliding panel, a curtain, or a blind. In one embodiment, the removable covering 310 is mechanically driven. In one embodiment, the frame 110 comprises steel. In another embodiment, the frame 110 comprises a lightweight metal, such as aluminum, magnesium, titanium, beryllium alloys, or combinations thereof. In still other embodiments, the frame 110 comprises OSB, reinforced OSB, lightweight OSB, or other engineered materials, such as engineered wood, composite board, particle board, press board, plywood, wood laminate, chip board, gypsum board, cement board, carbon fiber materials, or combinations thereof. In another embodiment, the frame 110 comprises plastic. In another embodiment, the frame 110 comprises an optically transparent or semi-optically transparent material, such as glass.

FIGS. 4A and 4B depict embodiments of the one or more connectors 220. The automated storage and retrieval system 100 comprises one or more connectors 220 mounted to the one or more walls 200 of the frame 110. The one or more positionable objects 210 are removably attached to the one or more connectors 220. In a preferred embodiment, the one or more connectors 220 comprise an attachment device such as hooks. FIG. 4A depicts one hook 400. In one embodiment, the hooks 400 comprise electrical conductors 410. The electrical conductors 410 allow electrical appliances that hang from the attachment devices such as hooks 400 to connect directly to power sources through the hooks. In another embodiment, the one or more connectors 220 comprise attachment devices such as magnets. FIG. 4B depicts a set of magnets 420. In still other embodiments, the connectors 220 comprise Velcro, adhesives, solenoids, or other materials.

FIG. 5A and FIG. 5B depict the one or more connectors 220 mounted to the one or more walls 200 of the frame 110. In a preferred embodiment, the one or more connectors 220 are mounted on two opposite walls 200 of the frame 110. In a preferred embodiment, at least one of the two opposite walls 200 comprise at least one access port 300. (One of the two opposite walls is not depicted in FIG. 5A and FIG. 5B such that the interior of the frame 110 is visible.) Because the one or more positionable objects 210 are removably attached to the one or more connectors 220, the number of connectors 220 depends on the number of the one or more positionable objects 220. In a preferred embodiment, each positionable object 210 is removably attached to two connectors 220, the two connectors 220 being spaced horizontally such that the two connectors 220 can support the weight of one positionable object 210. In one embodiment, the two connectors 220 are strong enough to support twenty pounds of weight. In other embodiments, more or less of the one or more connectors 220 are removably attached to each positionable object 210. In one embodiment, the one or more connectors 220 are spaced vertically such that a space between the one or more positionable objects 210 measures approximately one-half inch. The one or more connectors 220 are aligned such that the positionable objects 210 are also aligned in straight vertical columns. In one embodiment, the automated storage and retrieval system 100 comprises twenty-three positionable objects 210 arranged in two columns. FIG. 5A depicts the one or more connectors 220 mounted to the one or more walls 200 of the frame 110, arranged to accommodate the one or more positionable objects 210 in two columns, as they would be in this embodiment (though one wall is not depicted such that the interior of the frame 110 is visible). In a preferred embodiment, the automated storage and retrieval system 100 comprises forty-six positionable objects 210 arranged in four columns. FIG. 5B depicts the one or more connectors 220 mounted to the one or more walls 200 of the frame 110, arranged to accommodate the one or more positionable objects 210 in four columns, as they would be in this preferred embodiment (though one wall is not depicted such that the interior of the frame 110 is visible). In other embodiments, more or less of the one or more positionable objects 210 are arranged in three or more than four columns.

FIG. 6A depicts one embodiment of a planar motion mechanism 230. The automated storage and retrieval system 100 comprises one or more planar motion mechanisms 230. A planar motion mechanism, as described in the present invention, is a mechanism capable of movement in two dimensions, the movement in each of the two dimensions being controlled by at least one actuator. In one embodiment, the one or more planar motion mechanisms 230 comprise electromechanical mechanisms. In a preferred embodiment, the one or more planar motion mechanisms 230 comprise H-bots. One advantage of an H-bot over other planar motion mechanisms is the feature that the actuators (the motors) remain stationary, which decreases the mass of the moving parts, allowing for faster movement and direction changes, and decreasing space requirements for the system. In one embodiment, the automated storage and retrieval system 100 comprises two planar motion mechanisms 230. In another embodiment, the automated storage and retrieval system 100 comprises four planar motion mechanisms 230. Other embodiments comprise one, three, or more than four planar motion mechanisms 230.

The one or more planar motion mechanisms 230 are movably mounted to the frame 110 adjacent to the one or more positionable objects 210. The one or more planar motion mechanisms 230 select one of the one or more positionable objects 210. The one or more planar motion mechanisms comprise one or more end effectors 240, which retrieve and suspend the selected one of the one or more positionable objects 210 from the one or more connectors 220 and reposition the selected one of the one or more positionable objects 210 within the frame 110.

In one embodiment, the one or more planar motion mechanisms 230 comprise an upper support 600, a lower support 610, horizontal tracks 620, vertical tracks 630, a vertical slide table 640, a horizontal slide table 650, an end effector 240, a belt 670, pulleys 680, two electric motors 690, and a microcontroller 695. The vertical slide table 640 moves up and down vertically along the vertical tracks 630. The horizontal slide table 650 moves back and forth horizontally along the horizontal tracks 620. The end effector 240 is fixed to the horizontal slide table 650, which allows the end effector 240 to have two degrees of freedom—vertically along the vertical tracks 630 and horizontally along the horizontal tracks 620. The motors 690 drive the belt 670 through a series of pulleys 680, the belt 670 being coupled to the end effector 240. Each motor 690 is capable of applying both a positive and a reverse torque, and a combination of the torque from the two motors 690 moves the end effector 240 through the two dimensions. The microcontroller 695 provides instructions to the motors 690 as to the magnitude and direction of the torque provided. In one embodiment, the microcontroller 695 receives an input from a user of a request for a target positionable object 1100. In one embodiment, the microcontroller 695 recalls from (non-volatile) memory a current position of the target positionable object 1100, as well as current positions of other positionable objects 210 within the frame 110. In other embodiments, the microcontroller 695 determines the current positions of the one or more positionable objects 210 from inputs from cameras or machine reader indicia, such as bar codes or radio-frequency identification (RFID) tags. The microcontroller 695 then produces a sequence of movements necessary to bring the target positionable object 1100 to an access port 300. The microcontroller 695 then instructs the motors 690 to carry out each movement in the sequence, and the target positionable object 1100 is brought to an access port 300. In one embodiment, the microcontroller 695 is programmed to reposition the one or more positionable objects 210 in a revolving clockwise or counterclockwise sequence. In a preferred embodiment, the microcontroller 695 is programmed to reposition the one or more positionable objects 210 in a non-revolving sequence. In one embodiment, the automated storage and retrieval system 100 comprises a battery system that powers the motors 690 in the event that there is a power outage.

FIG. 6B depicts one embodiment of an end effector 240 of a planar motion mechanism 230. The one or more planar motion mechanisms 230 comprise one or more end effectors 240. The one or more end effectors 240 retrieve and suspend a selected one of the one or more positionable objects 210 from the one or more connectors 220 and reposition the selected one of the one or more positionable objects 210 within the frame 110. In one embodiment, the end effector 240 includes a slot that mates with a key attached to the one or more positionable objects 210. When the slot mates with the key, the one or more planar motion mechanisms 230 are able to lift, suspend, and reposition the one or more positionable objects 210. In other embodiments, the end effector 240 is any of a variety of connecting mechanisms. In one embodiment, the end effector 240 is a platform that lifts the one or more positionable objects 210 from below. In another embodiment, the end effector 240 is a magnetic attachment. In another embodiment, the end effector 240 has moveable parts, such as finger-like members, and attaches to each positionable object 210 in a manner similar to a hand grasping an item. An end effector 240 is capable of moving horizontally and vertically to move and reposition the one or more positionable objects 210 in two dimensions.

FIG. 7A and FIG. 7B depict embodiments of one or more planar motion mechanisms 230 mounted to the frame 110. In one embodiment, the one or more planar motion mechanisms 230 extend the entire length of the frame 110. FIG. 7A depicts one embodiment that comprises two planar motion mechanisms 230. In one such embodiment, two planar motion mechanisms 230 are mounted on two opposite walls 200 of the frame 110. In this embodiment, the two planar motion mechanisms 230 are mounted on two opposite walls 200 that are perpendicular to the walls 200 on which the one or more connectors 220 are mounted. In this embodiment, the two planar motion mechanisms 230 mirror each other's movement to work together to reposition the one or more positionable objects 210. FIG. 7B depicts a preferred embodiment comprising four planar motion mechanisms 230. In one such embodiment, two planar motion mechanisms 230 are mounted on two opposite walls 200 of the frame 110, which opposite walls 200 are perpendicular to the walls 200 on which the one or more connectors 220 are mounted. Two more planar motion mechanisms 230 are positioned back to back in the middle of the frame 110, mounted to walls 200 at the top and the bottom of the frame 110 to hold them upright and in place. Another embodiment comprises one planar motion mechanism 230. Other embodiments comprise three or more than four planar motion mechanisms 230.

FIG. 8 depicts one embodiment of a positionable object 210. The automated storage and retrieval system 100 comprises one or more positionable objects 210 arranged planarly within the frame 110. The one or more positionable objects 210 are removably attached to the one or more connectors 220. In a preferred embodiment, the one or more positionable objects 210 comprise a rectangular prismatic configuration. However, an infinite number of configurations are possible. In a preferred embodiment, the one or more positionable objects 210 measure approximately twelve inches tall, twelve inches deep, and twenty inches wide. These measurements are significant in that they are large enough to fit almost any general kitchen appliance. In one embodiment, the one or more positionable objects 210 comprise a lightweight metal, such as aluminum, magnesium, titanium, beryllium alloys, or combinations thereof. In another embodiment, the one or more positionable objects 210 comprise plastic. Because the one or more positionable objects 210 are removably attached to one or more connectors 220 on the walls 200 of the frame 110 and are, therefore, suspended in air rather than stacked on top of each other as in prior art, the one or more positionable objects 210 do not have the same structural requirements that they would if they had to bear the weight of other positionable objects 210. Therefore, the one or more positionable objects 210 can comprise lighter, thinner, and more economical materials, which saves overall manufacturing costs. They can also be placed closer together, which further optimizes space. In one embodiment, the one or more positionable objects 210 comprise storage bins. In one embodiment, the storage bins are open at the top. In another embodiment, the storage bins are open in the front. In another embodiment, the one or more positionable objects 210 comprise appliances selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. Such appliances can be inserted directly into the automated storage and retrieval system 100, without being placed into a storage bin. In a preferred embodiment, each positionable object 210 comprises one or more connection points 800 where the one or more connectors 220 can attach. In a preferred embodiment, the one or more connection points 800 comprise indentations in the shape of a hook, such that a hook can be inserted and catch. In other embodiments, the one or more connection points 800 comprise magnets, Velcro, adhesives, or solenoids. It is important that the one or more connection points 800 and the one or more connectors 220 be able to connect loosely, such that the connection can be created easily and also removed easily. In a preferred embodiment, each positionable object 210 comprises two connection points 800 on two opposite sides of the positionable object 210. In a preferred embodiment, each positionable object 210 further comprises one or more keys 810. A key is a protruding element that can mate with one or more end effectors 240 attached to the one or more planar motion mechanisms 230, such that the one or more planar motion mechanisms 230 can attach to, lift, and move the one or more positionable objects 210 with the one or more end effectors 240. In a preferred embodiment, the one or more keys 810 are positioned on two opposite sides of the one or more positionable objects 210, the two opposite sides being perpendicular to sides that comprise one or more connection points 800. In other embodiments, the one or more keys 810 can be replaced with magnets or other connectors.

FIG. 9A and FIG. 9B depict the one or more positionable objects 210 arranged planarly within the frame 110 of the automated storage and retrieval system 100 and the one or more planar motion mechanisms 230 movably mounted to the frame 110 adjacent to the one or more positionable objects 210. The one or more positionable objects 210 are removably attached to the one or more connectors 220, which are mounted to the one or more walls 200 of the frame 110 (two walls are not depicted such that the interior can be seen). The one or more positionable objects 210 maintain this position—removably attached to the one or more connectors 220—when resting. Because each positionable object 210 is hanging from a wall 200, the one or more positionable objects do not rest on top of each other as in prior art automated storage and retrieval systems. For this reason, the one or more positionable objects 210 do not have structural requirements, so they can comprise lighter, thinner, and more economical materials, which saves overall manufacturing costs. The one or more positionable objects 210 can also be placed closer together, which further optimizes space. In one embodiment, a space between the one or more positionable objects 210 on each side measures approximately one-half inch. This measurement of space is just enough to allow the one or more planar motion mechanisms 230 to lift and suspend a selected one of the one or more positionable objects 210 from the one or more connectors 220 and reposition the selected one of the one or more positionable objects 210 within the frame 110. The one or more positionable objects 210 can be repositioned in a non-clockwise or counterclockwise (non-circular) sequence because they are not stacked but all move one at a time.

In one embodiment, the one or more positionable objects 210 are arranged in two columns within the frame 110. FIG. 9A depicts this embodiment of the automated storage and retrieval system 100. In other embodiments, the one or more positionable objects 210 are arranged in three or more columns within the frame 110. In a preferred embodiment, the one or more positionable objects 210 are arranged in four columns within the frame 110. FIG. 9B depicts this embodiment of the automated storage and retrieval system 100. At least one space the size of one positionable object 210 is left vacant. The at least one vacant space makes it possible to move one positionable object 210 either horizontal or vertically into the at least one vacant space. In some embodiments, more than one space the size of one positionable object 210 is left vacant. Because the one or more positionable objects 210 are moved one at a time, any number of vacant spaces are possible, and the system can still function, unlike in prior art automated storage and retrieval systems. The number of positionable objects 210 in each column is variable, limited only by space available and the size of the frame 110. The one or more positionable objects 210 are aligned in straight vertical and horizontal lines. FIG. 9A also depicts one positionable object 210 comprising an appliance 900 selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. (In this case the appliance is a microwave.)

FIG. 10 depicts one embodiment of the one or more planar motion mechanisms 230 comprising one or more end effectors 240 retrieving and suspending a selected one of the one or more positionable objects 210 from the one or more connectors 220 and repositioning the selected one of the one or more positionable objects 210 within the frame 110. Before retrieval and suspension, the one or more positionable objects 210 are removably attached to the one or more connectors 220, which are mounted to the one or more walls 200. In one embodiment, when a microcontroller 695 sends instructions to the one or more planar motion mechanisms 230, the end effector 240 of each planar motion mechanism 230 moves to a specified position in preparation to lift the selected one of the one or more positionable objects 210. In embodiments comprising more than one planar motion mechanism 230, each planar motion mechanism's movement mirrors the planar motion mechanism 230 positioned opposite to it. In one embodiment, each end effector 240 attaches to a key 810 positioned on one of two opposite sides of the one or more positionable objects 210. The end effector 240 then retrieves, lifts, and suspends a selected one of the one or more positionable objects 210 from the one or more connectors 220 and repositions the selected one of the one or more positionable objects 210 within the frame 110 by moving it from a first position to a second position. The one or more positionable objects 210 are reattached to the connectors 220 mounted to the one or more walls 200 in the second position. The one or more planar motion mechanisms 230 then continue carrying out other movement instructions or wait for additional instructions. FIG. 10 depicts a selected one of the one or more positionable objects 210 approximately halfway between a first position and a second position, each position being defined by the placement of connectors 220 on an adjacent wall 200.

FIG. 11A-FIG. 12D depict the one or more positionable objects 210 being repositioned in sequence. In one embodiment of the automated storage system 100, a microcontroller 695 receives an input from a user of a request for a target positionable object 1100. The microcontroller 695 recalls from memory a current position of the target positionable object 1100, as well as current positions for other positionable objects 210 within the frame 110, then produces a sequence of movements necessary to bring the target positionable object 1100 to an access port 300. The microcontroller 695 then instructs the motors 690 to carry out each movement in the sequence, and the target positionable object 1100 is brought to the access port 300.

FIG. 11A-FIG. 11E depict the one or more positionable objects 210 being repositioned in a revolving clockwise or counterclockwise sequence. In one embodiment, the microcontroller 695 is programmed to reposition the one or more positionable objects 210 in this sequence. In this sequence, the one or more positionable objects 210 are moved in a circular motion by moving a single positionable object 210 horizontally from a position in a first column to a first vacant space 1110 in a second column of positionable objects, as depicted in FIG. 11A, leaving behind a second vacant space 1120 in the first column, as depicted in FIG. 11B. Then, all remaining positionable objects 210 in the first column are moved vertically to fill the second vacant space 1120, as depicted in FIG. 11B, leaving behind a third vacant space 1130 located in the first column, as depicted in FIG. 11C. A positionable object 210 from the second column is moved horizontally into the first column to fill the third vacant space 1130, as depicted in FIG. 11C, leaving behind a fourth vacant space 1140 located in the second column, as depicted in FIG. 11D. Finally, all remaining positionable objects 210 in the second column are moved vertically to fill the fourth vacant space 1140, as depicted in FIG. 11D, leaving behind a fifth vacant space 1150 in the second column, as depicted in FIG. 11E. This process is repeated until a target positionable object 1100 has reached an access port 300.

FIG. 12A-FIG. 12D depict the one or more positionable objects 210 being repositioned in a non-revolving sequence. In one embodiment, the microcontroller 695 is programmed to reposition the one or more positionable objects 210 in this sequence. In this sequence, the one or more positionable objects 210 are moved in a direct sequence that entails the least number of moves that are possible. A single positionable object 210 is moved horizontally from a position in a first column to a first vacant space 1210 in a second column of positionable objects, as depicted in FIG. 12A, leaving behind a second vacant space 1220 in the first column, as depicted in FIG. 12B. Then, a positionable object 210 in the first column is moved vertically to fill the second vacant space 1220, as depicted in FIG. 12B, leaving behind a third vacant space 1230 located in the first column, as depicted in FIG. 12C. A positionable object 210 from the second column is moved horizontally into the first column to fill the third vacant space 1230, as depicted in FIG. 12C, leaving behind a fourth vacant space 1240 located in the second column, as depicted in FIG. 12D. This process is repeated until a target positionable object 1100 has reached an access port 300. Moving the one or more positionable objects 210 in this sequence, rather than in a circular sequence, reduces the amount of time needed to access a target positionable object in most cases. Also, a natural consequence of the method is that often-used positionable objects 210 will remain near an access port 300, and be, therefore, quickly accessible, while infrequently-used positionable objects 210 will remain at the farthest distances, which increases efficiency. Furthermore, moving one positionable object 210 at a time in a non-circular sequence in this manner makes it possible for the automated storage and retrieval system 100 to function even when not all positions within the columns within the frame 110 are filled with positionable objects 210.

FIG. 13 depicts an automated storage and retrieval system 100 comprising a user interface 1300. In a preferred embodiment, the user interface 1300 comprises a voice control user interface. In other embodiments, the user interface 1300 comprises buttons or a touch-sensitive display on a mobile device. In one embodiment, a user assigns customizable identifiers to the one or more positionable objects 210 via the user interface 1300. In one embodiment, the user interface 1300 comprises a timer. The timer alerts the user when a target positionable object 210 arrives at an access port 300. In one embodiment, the user assigns codes to the one or more positionable objects 210 relative to the degree of use via the user interface 1300.

The invention claimed is:
1. An automated storage and retrieval system, comprising:
a frame comprising one or more walls within and about the periphery of the frame;
the walls comprising connectors on an interior surface of the walls;
one or more positionable objects removably mounted on the connectors by means of an attachment device;
the one or more positionable objects comprising a first attachment mechanism;
one or more planar motion mechanisms movably mounted to the frame adjacent to the one or more positionable objects;
the one or more planar motion mechanisms comprising an end effector comprising a second attachment mechanism connectable with the first attachment mechanism; wherein
the end effector connects to a selected one of the one or more positionable objects and retrieves the selected one and repositions the selected one on the one or more walls.

2. The automated storage and retrieval system of claim 1, wherein the one or more planar motion mechanisms comprise electromechanical mechanisms.
3. The automated storage and retrieval system of claim 1, wherein the one or more planar motion mechanisms comprise H-bots.
4. The automated storage and retrieval system of claim 1, comprising two planar motion mechanisms.
5. The automated storage and retrieval system of claim 1, comprising four planar motion mechanisms.
6. The automated storage and retrieval system of claim 1, wherein the one or more positionable objects are arranged in two columns within the frame.
7. The automated storage and retrieval system of claim 1, wherein the one or more positionable objects are arranged in three or more columns within the frame.
8. The automated storage and retrieval system of claim 1, wherein the one or more positionable objects measure at least approximately twelve inches tall, twelve inches deep, and twenty inches wide.
9. The automated storage and retrieval system of claim 1, wherein a space between the one or more positionable objects measures approximately one-half inch.
10. The automated storage and retrieval system of claim 1, wherein the one or more positionable objects comprise storage bins.
11. The automated storage and retrieval system of claim 1, wherein the one or more positionable objects comprising appliances selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills.
12. The automated storage and retrieval system of claim 1, wherein the one or more connectors comprise hooks.
13. The automated storage and retrieval system of claim 12, wherein the hooks comprise electrical conductors.
14. The automated storage and retrieval system of claim 1, wherein the one or more connectors comprise magnets.
15. The automated storage and retrieval system of claim 1, wherein the one or more positionable objects are repositioned in a revolving clockwise or counterclockwise sequence.
16. The automated storage and retrieval system of claim 1, wherein the one or more positionable objects are repositioned in a non-revolving sequence.
17. The automated storage and retrieval system of claim 1, wherein the frame further comprises one or more access openings, each access opening comprising a window that provides access to only one of the one or more positionable objects.
18. The automated storage and retrieval system of claim 1, further comprising a user interface.
19. The automated storage and retrieval system of claim 18, the user interface comprising a voice control user interface.
20. The automated storage and retrieval system of claim 18, wherein a user assigns customizable identifiers to the positionable objects via the user interface.

\* \* \* \* \*